US012403626B1

(12) United States Patent
Phillips

(10) Patent No.: US 12,403,626 B1
(45) Date of Patent: Sep. 2, 2025

(54) PIPE COLLAR, MOLD AND METHOD

(71) Applicant: The Pipe Collar, LLC, Forest, VA (US)

(72) Inventor: Alyson Phillips, Forest, VA (US)

(73) Assignee: The Pipe Collar, LLC, Forest, VA (US)

( * ) Notice: Subject to any disclaimer, the term of this patent is extended or adjusted under 35 U.S.C. 154(b) by 0 days.

(21) Appl. No.: 18/816,169

(22) Filed: Aug. 27, 2024

(51) Int. Cl.
*B28B 23/02* (2006.01)
*B28B 7/00* (2006.01)
*E02B 11/00* (2006.01)

(52) U.S. Cl.
CPC .......... *B28B 23/024* (2013.01); *B28B 7/0073* (2013.01); *E02B 11/00* (2013.01)

(58) Field of Classification Search
CPC .......... E02B 11/005; E02B 11/00; E04B 1/32; E04B 7/10; E04B 7/102; E04B 2001/3264; B28B 23/024; B28B 7/0073
See application file for complete search history.

(56) References Cited

U.S. PATENT DOCUMENTS

| | | | | | |
|---|---|---|---|---|---|
| 1,213,916 | A * | 1/1917 | Souder | E01F 5/005 | 405/125 |
| 1,384,514 | A * | 7/1921 | Close | E01F 5/005 | 249/12 |
| 2,265,871 | A * | 12/1941 | Chasteen | E21D 9/005 | 249/12 |
| 8,888,067 | B1 * | 11/2014 | Calmes | B32B 27/065 | 249/16 |
| 2013/0028658 | A1 * | 1/2013 | Yee | E04B 1/41 | 29/527.1 |

* cited by examiner

*Primary Examiner* — Patrick J Maestri
(74) *Attorney, Agent, or Firm* — Williams Mullen; Thomas F. Bergert

(57) ABSTRACT

Embodiments of the present disclosure provide a pipe collar for a drainage pipe and a mold for the pipe collar, wherein the pipe collar is formed by positioning mold walls adjacent, atop and/or around a mold face, inserting one or more safety reinforcement handlock bar elements through one or more of the walls, filling the mold with a consolidating material and removing the walls. Upon removing the walls, a formed pipe collar can be lifted, moved and otherwise manipulated using the safety reinforcement handlock bar element(s) to position the pipe collar above a drainage pipe.

8 Claims, 9 Drawing Sheets

PIPE COLLAR, MOLD AND METHOD

TECHNICAL FIELD

The present disclosure relates to pipe collars and, more particularly, to a pipe end wall collar, mold and method for protecting and improving the appearance of drainage pipe ends.

BACKGROUND AND SUMMARY

Drainage pipes and/or culverts are often used in residential settings under a driveway near the street. These drainage pipes form a tunnel permitting rainwater to flow underneath the driveway. Typically, drainage pipes are made of metal or concrete and are embedded in the surrounding soil. Stormwater runoff, drainage buildup and other matter can degrade the qualities and appearance of such drainage pipes. Further, exposed drainage pipes can be bent, crushed or damaged by various types of equipment working around the area where drainage pipes are located. Additionally, unprotected pipe ends can create safety hazards due to jagged, chipped or broken edges of whatever material is employed.

Embodiments of the present disclosure provide a pipe collar, mold and method facilitating the protection of drainage pipes from damage and erosion while providing an aesthetically pleasing appearance. Embodiments of the present disclosure are provided by employing a mold face which may optionally be decorative, assembling mold walls adjacent and/or above the mold face, inserting one or more safety reinforcement handlock bar elements through openings in opposing mold walls and inserting a consolidating material such as concrete atop the mold face and between the mold walls. In various embodiments, the safety reinforcement handlock bar includes one or more sleeves provided around at least one or more portions of rebar, wherein the rebar is maintained within the mold to enhance strength and mobility of the pipe collar. In various embodiments, the mold walls include a substantially semi-circular wall that assists in forming a pipe collar with a semi-circular bottom wall adapted to sit atop and in communication with a drainage pipe.

DETAILED DESCRIPTION OF EMBODIMENTS

Figure 1:
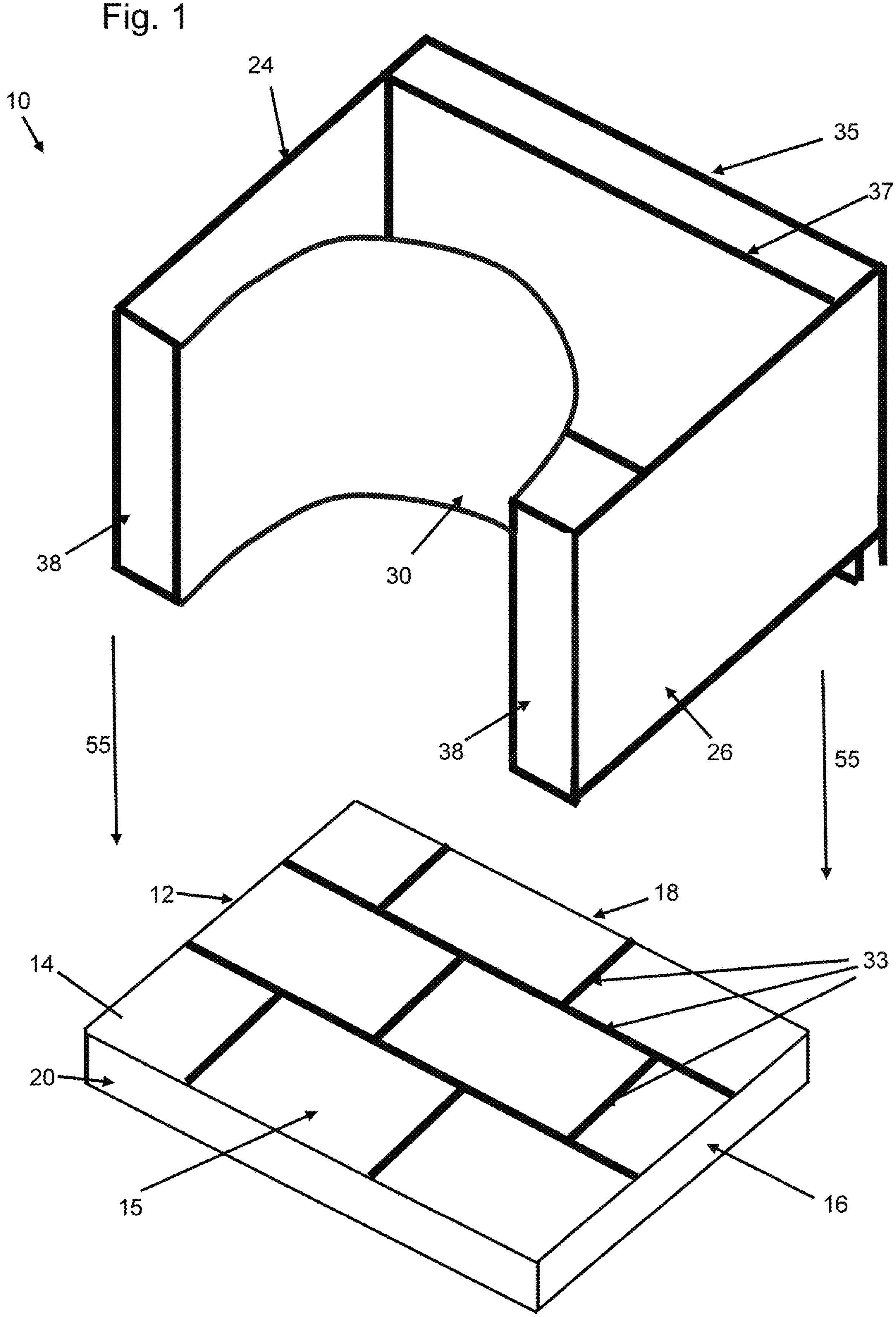
FIG. 1 is a perspective view of a mold face and mold walls according to embodiments of the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a safety reinforcement handlock bar may encompass one or more safety reinforcement handlock bars, reference to a wall may encompass one or more walls, and so forth.

As shown in FIGS. 1 through 7, a mold 10 is provided for producing a pipe collar as described herein. In various embodiments, the mold 10 includes a mold base 12 having a mold face 15, first 14 and second 16 side edges, a top edge 18 and a bottom edge 20. The mold 10 can also include first 24 and second 26 mold side walls, wherein the first mold side wall 24 is positioned adjacent or atop the first side edge 14 of the mold base 12 and the second mold side wall 26 is positioned adjacent or atop the second side edge 16 of the mold base 12 prior to the pipe collar being formed. The mold 10 can further include a mold bottom wall 30 formed in a rounded or semi-circular shape. The mold bottom wall 30 can be positioned atop the mold face 15 prior to the pipe collar being formed. In various embodiments, the mold face 15 is formed with a physical pattern as indicated by lines 33, and it will be appreciated that the physical pattern 33 on the mold face 15 can cause the inverse pattern to be formed on the front main face of the pipe collar when formed according to the present disclosure, as disclosed elsewhere herein. It will be appreciated that the physical pattern 33, when present, can extend outwardly of the mold face, can be an indentation into the mold face or some combination of an outward extension and an inward indentation, for example.

In various embodiments, the mold 10 further includes a top wall 35 positioned so as to form a gap G (see FIG. 2) between the top wall 35 and the top edge 18 of the mold base 12. This gap G facilitates the formation of a front top face on the pipe collar when formed, and the front top face can be formed with no pattern, or some pattern that differs from the front main face of the pipe collar when formed, for example. The mold 10 can further include an intermediate wall 37 positioned adjacent the top edge 18 of the mold base 12. The intermediate wall 37 can function as a guide in various embodiments when the mold walls 24, 26, 35 are placed on or around the mold base 12, as indicated by arrows 55 in FIG. 1. The mold can also include bottom edge walls 38 positioned between each of the first 24 and second 26 mold side walls and the mold bottom wall 30.

Figure 2:
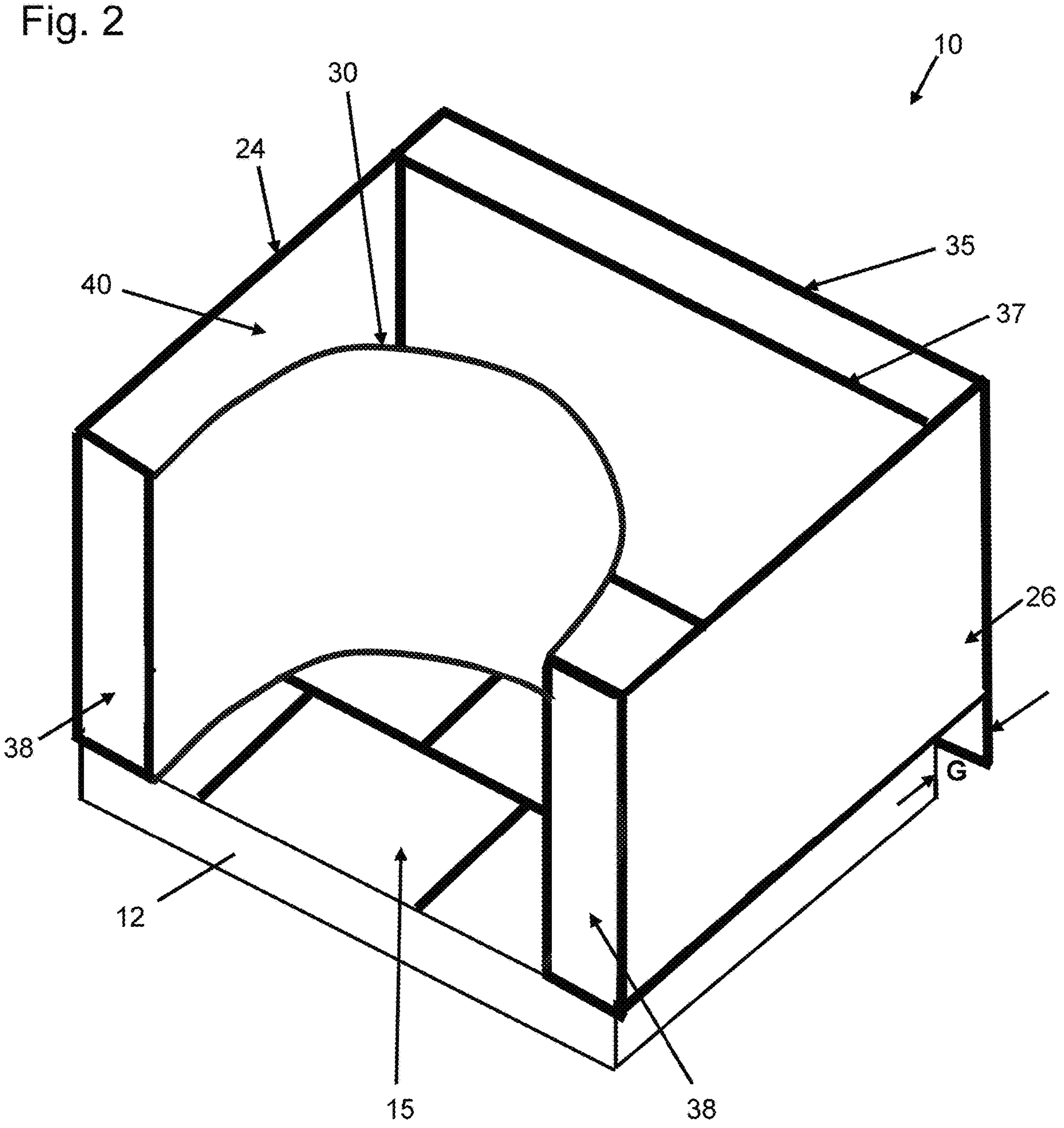
FIG. 2 is a perspective view of the mold walls positioned around and/or above the mold face in accordance with embodiments of the present disclosure.

The mold walls 24, 26, 30, 35, 37, 38 can be placed around, atop and/or over the mold base 12 as shown by arrows 55 in FIG. 1, prior to forming the pipe collar as described herein. FIG. 2 shows an embodiment with the full mold 10 in place, where walls 24, 26, 30 and 38 are atop the mold base 12. Top wall 35 is positioned with a gap G between the top wall 35 and the top edge 18 of the mold base 12. Intermediate wall 37 is positioned behind and adjacent/in contact with the top edge 18 of the mold base 12. In this way, the intermediate wall 37 aligns the rest of the mold 10 with the mold base 12 for accurate production of the pipe collar as described herein. The mold walls 24, 26, 30, 38, 35 and/or 37 form a cavity 40 as shown in FIG. 2.

Figure 3:
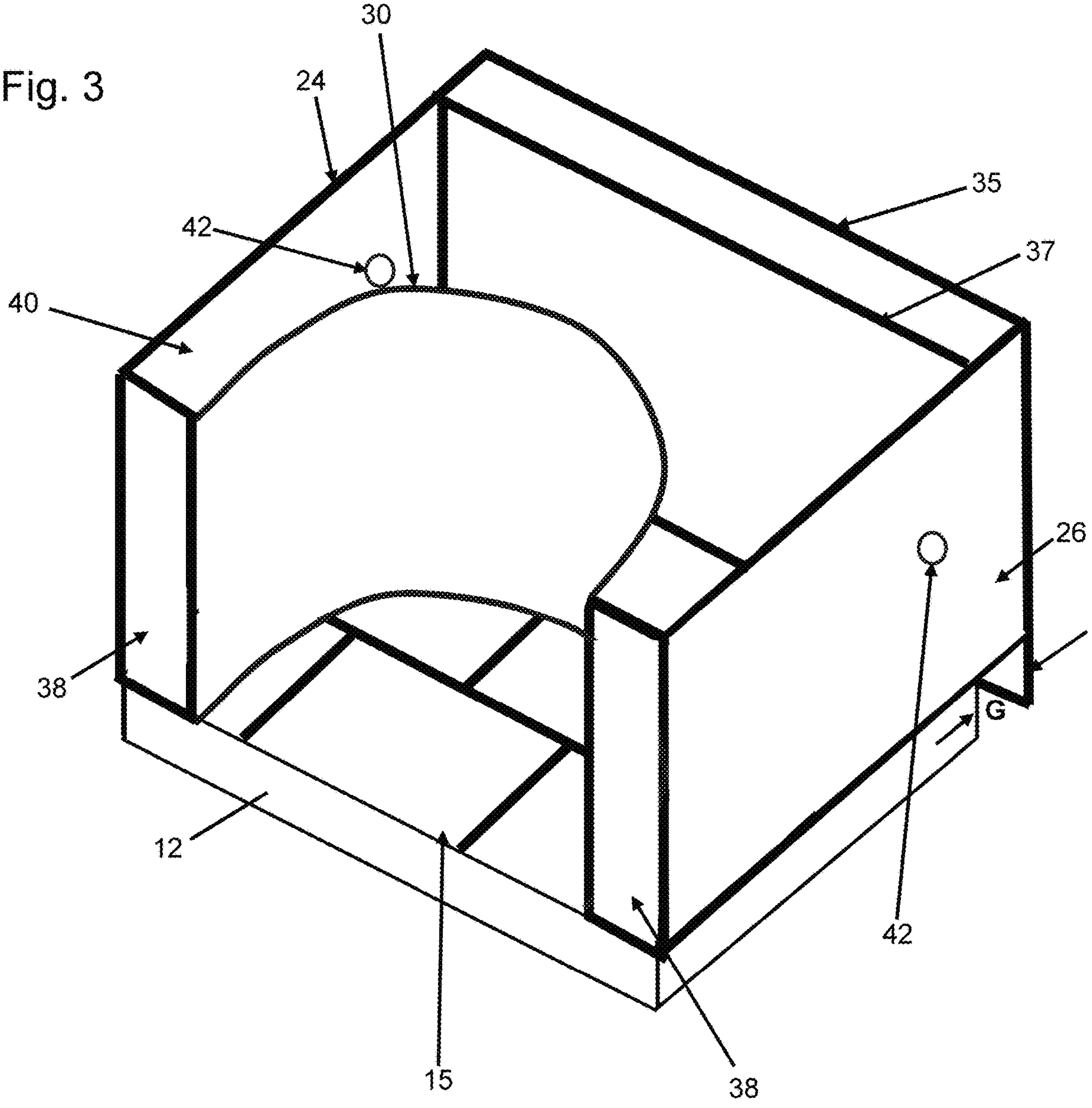
FIG. 3 is a perspective view similar to FIG. 2 that shows openings in opposite walls in accordance with embodiments of the present disclosure.
Figure 4:
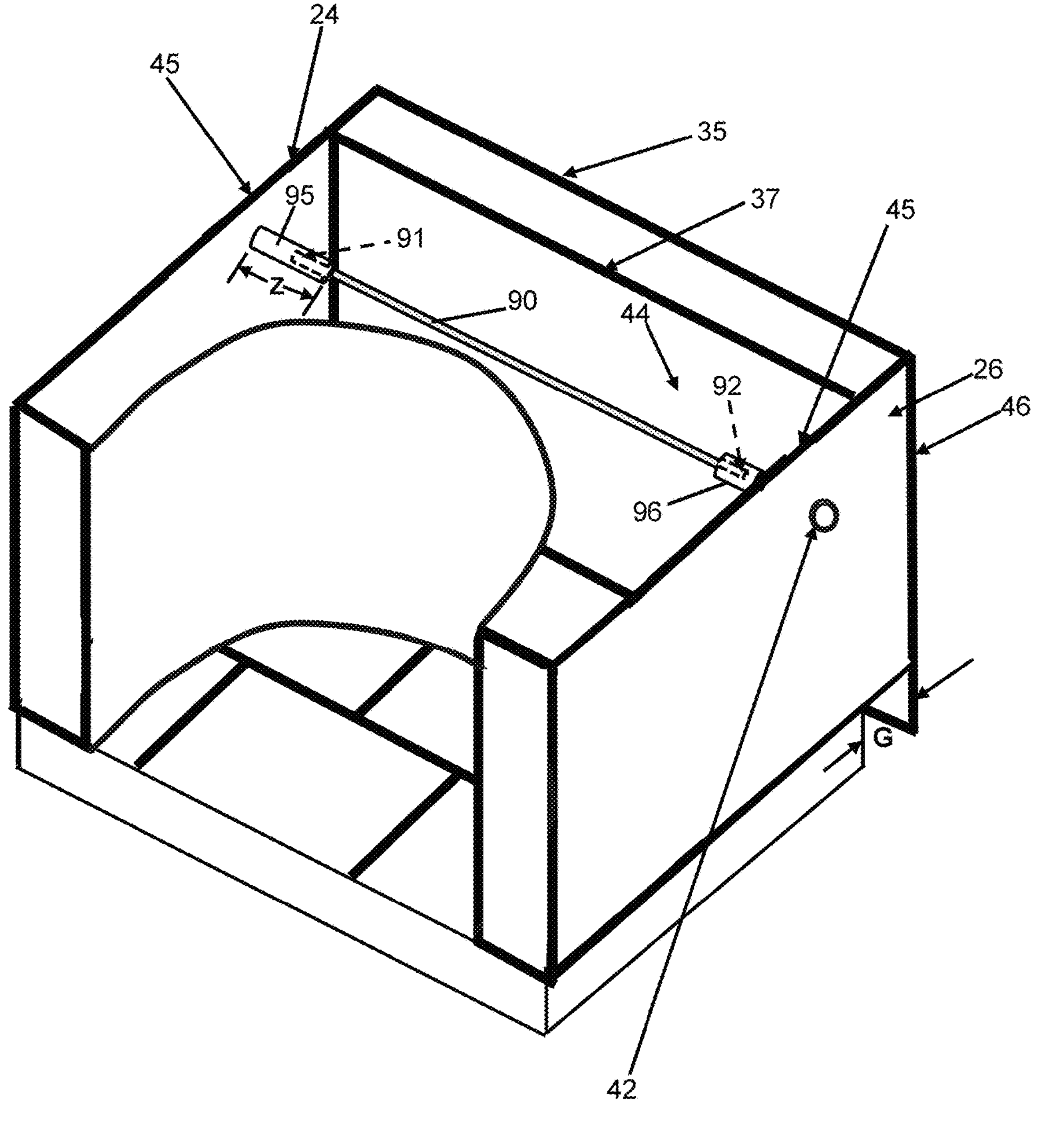
FIG. 4 is a perspective view similar to FIG. 3 that shows a safety reinforcement handlock bar element extending through the openings in the mold walls in accordance with embodiments of the present disclosure.

As shown in FIG. 3, embodiments of the present disclosure employ openings 42 formed in the first 24 and second 26 mold side walls. These openings 42 are aligned such that a safety reinforcement handlock bar element 44 (see FIGS. 4 and 5) can be positioned through the openings 42. The safety reinforcement handlock bar element 44 can be provided in many forms. In various embodiments, the safety reinforcement handlock bar element 44 includes a metal reinforcing bar or rebar 90 having first 91 and second 92 ends, wherein a sleeve 95 is positioned around the first end 91 and a sleeve 96 is positioned around the second end 92. Each sleeve 95, 96 is formed to snugly fit within the openings 42 by compression or friction fit. In various embodiments, the rebar 90 does not extend fully through the length Z of each sleeve 95, 96, but rather only partially through the length Z, as shown by the extent of the dashed lines of first end 91 and second end 92 in FIG. 4. In this way, the rebar 90 can be maintained in stationary position during consolidation of the consolidating material as described hereinafter while also leaving room within the sleeves 95, 96 for an external element such as a handle, screwdriver or other element (see 48 in FIGS. 7 and 8) to be inserted into the sleeves 95, 96 from the outside of the pipe collar 70 to facilitate transfer of the pipe collar 70 once formed, as described elsewhere herein.

In alternative embodiments, the first 91 and second 92 ends of the rebar 90 can extend the length of the sleeves 95, 96 and/or beyond the length of the sleeves 95, 96 and outwardly of walls 24, 26, wherein the rebar 90 can then be used as a handle for lifting and moving the pipe collar 70. In still other embodiments, the sleeves 95, 96 extend outwardly of walls 24, 26 and the externally extending portion of the sleeves can be used for lifting and moving the pipe collar. In such embodiments, the extending sleeves 95, 96 and/or extending rebar 90 could be hidden or cut off after installation depending upon desired appearances. In still other embodiments, the safety reinforcement handlock bar 44 is a rebar 90 alone, or a single sleeve alone, wherein the rebar or single sleeve extends from wall 24 to wall 26 and through the openings 42.

In various embodiments, the openings 42 are positioned a suitable distance below the top edge 45 of each of the first 24 and second 26 mold side walls, as well as a suitable distance inside of the edge 46 of the top wall 35 to enable the safety reinforcement handlock bar 44 to operate as a stabilizing element in the pipe collar once formed as well as to facilitate lifting when the pipe collar 70 is formed and requires manual movement (e.g., onto or off of a loading truck, and/or when being installed or moved).

Figure 5:
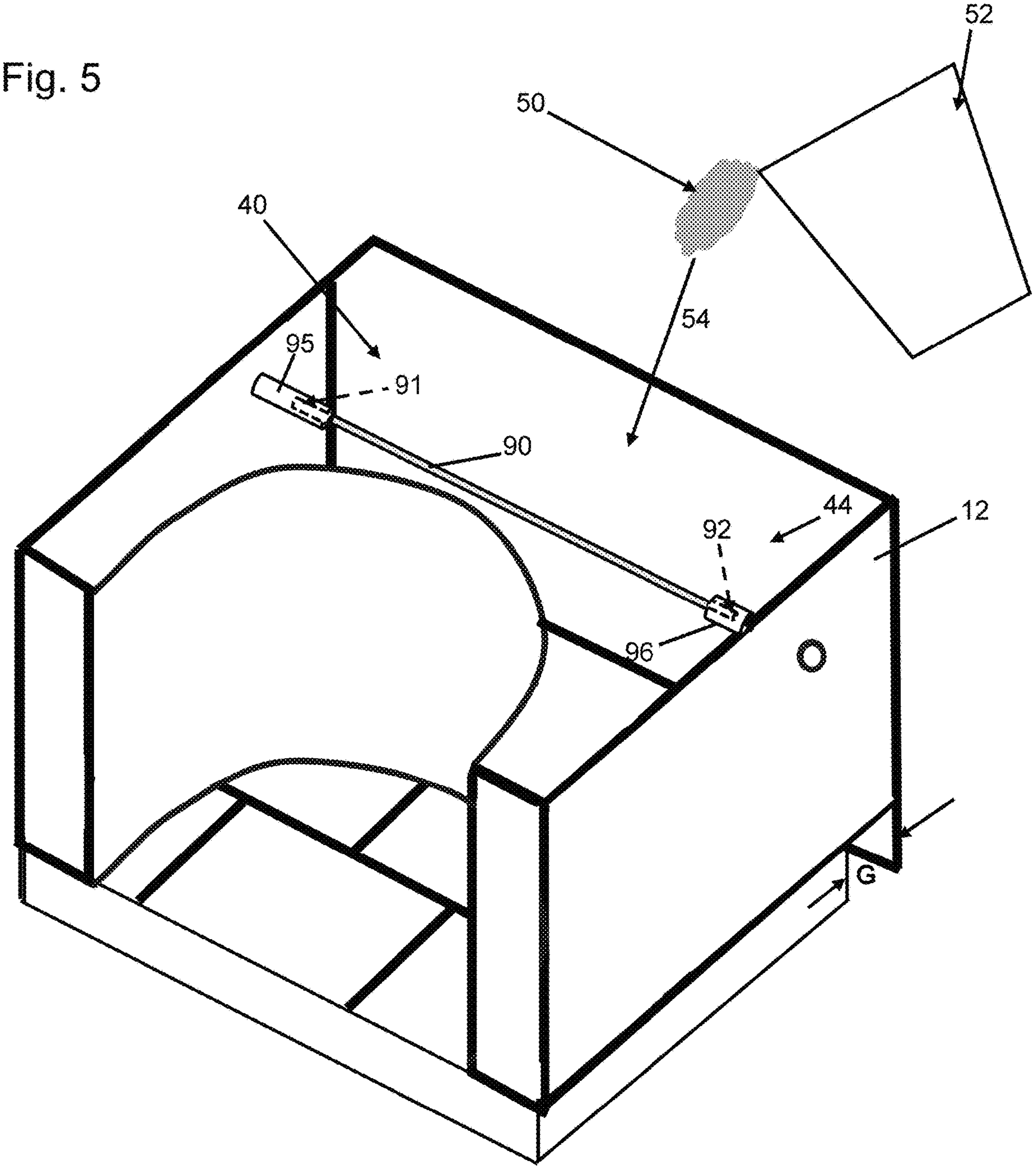
FIG. 5 is a perspective view similar to FIG. 4 that shows a consolidating material being poured into the mold in accordance with embodiments of the present disclosure.
Figure 6:
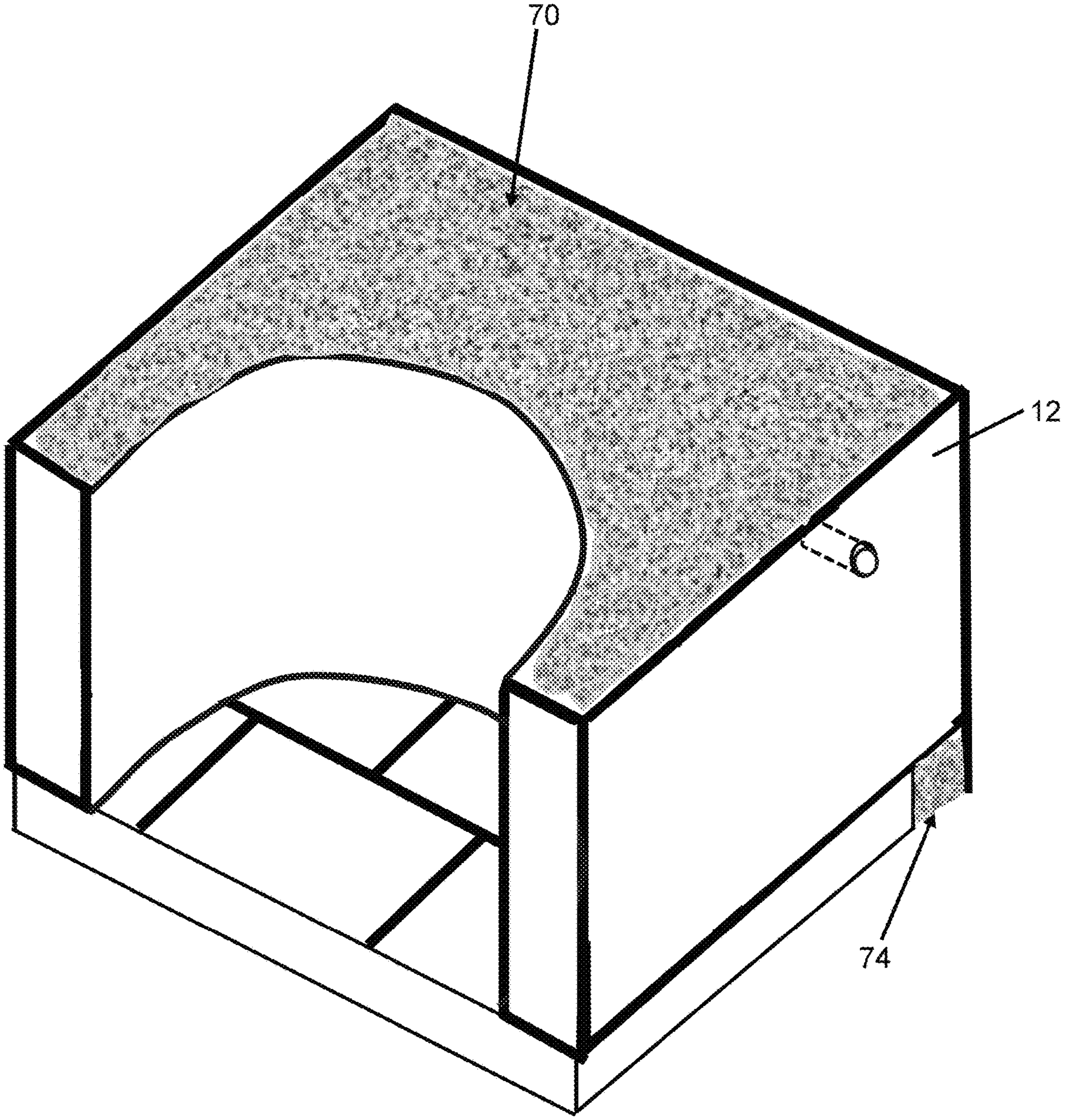
FIG. 6 is a perspective view showing the mold filled with the consolidating material in accordance with embodiments of the present disclosure.
Figure 7:
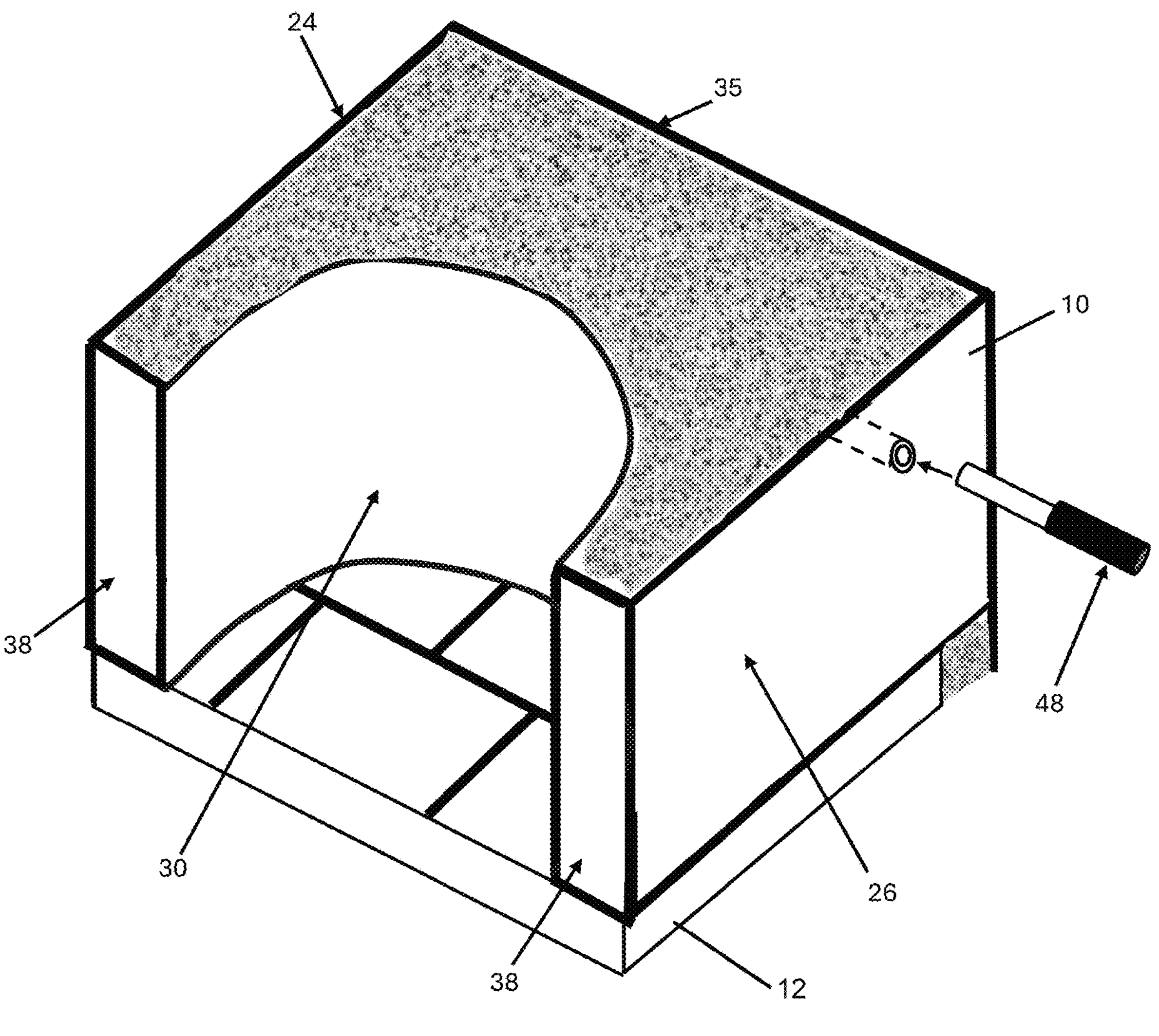
FIG. 7 is a perspective view showing directions for removing the mold walls in accordance with embodiments of the present disclosure.

It will be appreciated that once the mold is assembled and prepared for a consolidating material 50 such as concrete to be poured into the cavity 40, the intermediate wall 37 shown in FIGS. 1 through 4 can be removed. As shown in FIG. 5, a suitable dispensing apparatus 52 can pour the consolidating material (e.g., concrete) 50 into the cavity 40 as shown by arrow 54. With the intermediate wall 37 removed, the consolidating material can extend to the full range of the cavity 40 and promote a uniformly consistent pipe collar 70 that meets the intended face design 72, if any, prompted by the physical pattern 33, if any, on the mold face 15. The safety reinforcement handlock bar 44 is maintained in a static position after the pipe collar 70 is formed, reinforcing the consolidating material 50 and further providing openings for handles 48 such as screwdrivers or other tools to be inserted in the sleeves 95, 96 for carrying the pipe collar 70. With reference to FIG. 7, once the consolidating material has suitably consolidated and dried, the walls 24, 26, 30, 35 and 38 can be removed in various ways that will be understood to those of ordinary skill and the pipe collar 70 can be lifted off of the mold base 12. It will be appreciated that the handles 48 are inserted after the walls are removed from the formed pipe collar 70.

Figure 8:
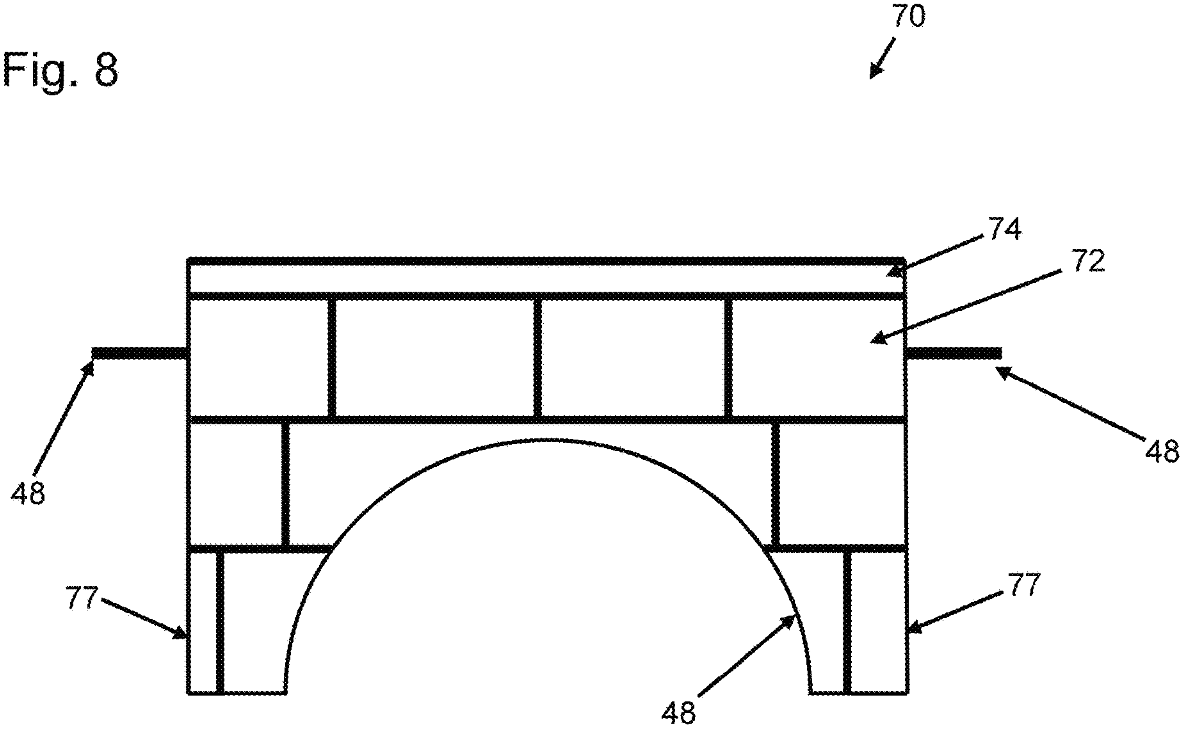
FIG. 8 is a front view of a pipe collar in accordance with embodiments of the present disclosure.
Figure 9:
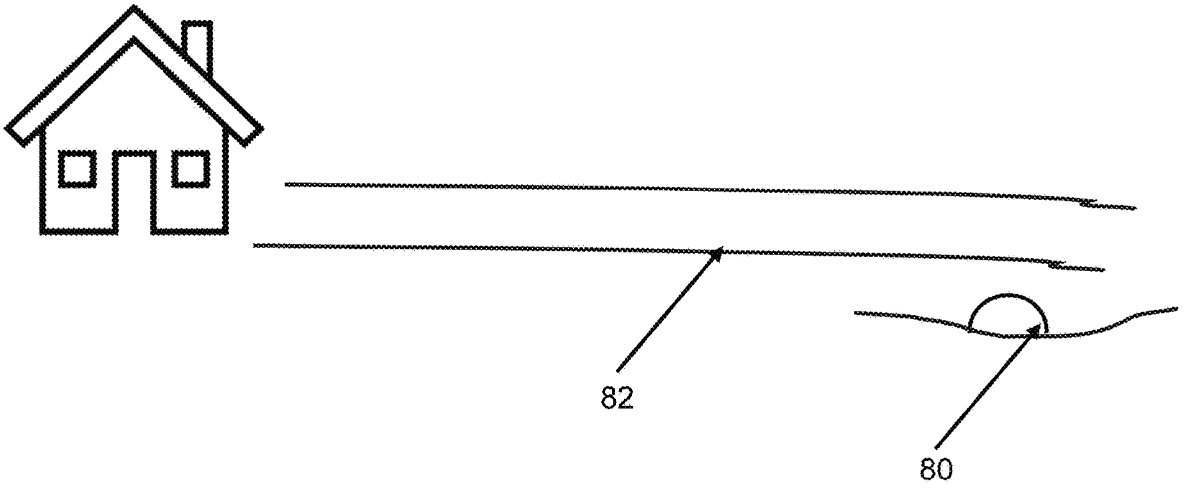
FIGS. 9 and 10 are schematic views showing a drainage pipe both without and with a pipe collar installed in accordance with embodiments of the present disclosure.
Figure 10:
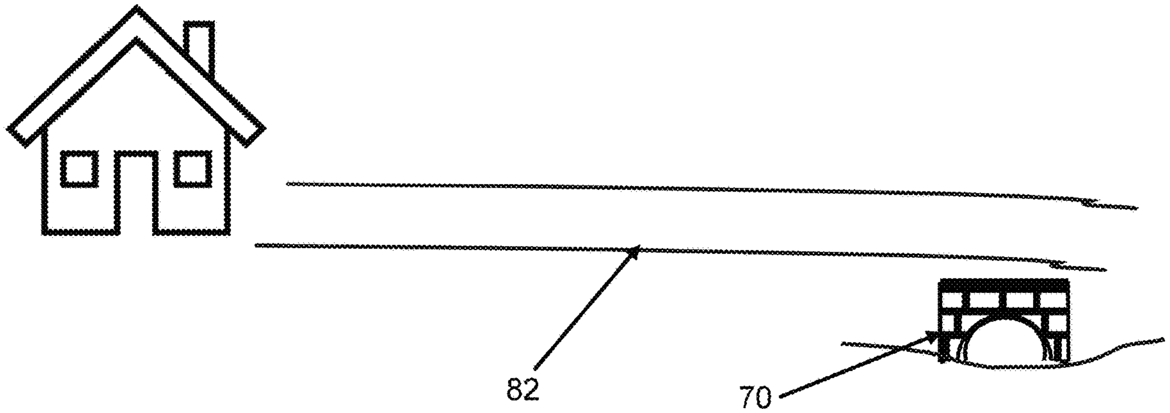

The finished pipe collar 70 (with handles 48 inserted) can appear as shown in FIG. 8, for example, and the handles 48 can be employed as described elsewhere herein for moving the pipe collar 70. Once the pipe collar 70 reaches its intended position, the handles 48 can be removed. The pipe collar 70 is thus formed with a front face 72 and optionally a top face 74, both of which may or may not have a pattern design. The pipe collar 70 in the embodiment of FIG. 8 is formed with substantially parallel outer side walls 77 due to the positioning of the first 24 and second 26 mold side walls during forming. The pipe collar 70 is further formed with a rounded bottom wall 75 that can substantially mate with a drainage pipe 80, such as alongside a residential driveway 82 as shown in FIGS. 9 and 10. It will be appreciated that the front top face 74, if provided with a pattern design, can be a pattern design that is the same or different from the patterned front face 72 of the pipe collar 70. In various embodiments, the front top face 74 is positioned above the collar patterned face 72 when the pipe collar 70 is in an upright position, as shown in FIG. 8.

In various embodiments, more than one safety reinforcement handlock bar 44 can be provided. In this way, multiple safety reinforcement handlock bars can extend from each side of a finished pipe collar, which can facilitate use of two hands or multiple people on each side assisting with the transport and placement of the pipe collar 70. In various embodiments, when the front face 72 has a pattern, the patterned front face 72 can comprise a brick pattern, a stone pattern, a wood or timber pattern or a variety of other patterns as desired.

The present disclosure describes numerous embodiments of the present invention, and these embodiments are presented for illustrative purposes only. These embodiments are described in sufficient detail to enable those skilled in the art to practice the invention embodiments, and it will be appreciated that other embodiments may be employed and that structural, logical, software, electrical and other changes may be made without departing from the scope or spirit of the present invention. Accordingly, those skilled in the art will recognize that the present invention may be practiced with various modifications and alterations. Although particular features of the present invention can be described with reference to one or more particular embodiments or figures that form a part of the present disclosure, and in which are shown, by way of illustration, specific embodiments of the invention, it will be appreciated that such features are not limited to usage in the one or more particular embodiments or figures with reference to which they are described. The present disclosure is thus neither a literal description of all embodiments of the invention nor a listing of features of the invention that must be present in all embodiments.

The invention claimed is:

1. A pipe collar comprising:

a concrete collar formed by pouring concrete into a cavity of a mold, wherein the cavity is defined by mold walls positioned around, atop or over a mold base, wherein at least a subset of the mold walls is formed in a rounded or semi-circular shape so as to produce the concrete collar with a rounded or semi-circular bottom wall, wherein the mold base is formed with a mold face, and wherein the mold face faces the concrete collar to form a collar patterned face, wherein the mold walls comprise a top wall positioned so as to form a gap between the top wall and the mold base, whereupon the concrete collar comprises a front top face and the collar patterned face; and a safety reinforcement handlock bar extending through the concrete collar.

2. The pipe collar of claim 1, wherein the safety reinforcement handlock bar comprises a rebar positioned within one or more sleeves.

3. The pipe collar of claim 1, wherein the safety reinforcement handlock bar is maintained in a static position after the concrete collar is formed.

4. The pipe collar of claim 1, wherein the mold comprises the mold walls and the mold base.

5. The pipe collar of claim 1, wherein the collar patterned face comprises a brick pattern.

6. The pipe collar of claim 1, wherein the collar patterned face comprises a stone pattern.

7. The pipe collar of claim 1, wherein the collar patterned face comprises a timber pattern.

8. The pipe collar of claim 1, wherein the front top face is positioned above the collar patterned face when the concrete collar is in an upright position.

* * * * *